United States Patent
Vassilovski

(10) Patent No.: US 7,692,579 B2
(45) Date of Patent: Apr. 6, 2010

(54) METHODS AND APPARATUS FOR ACTUATED POSITION DETERMINATION IN A WIRELESS COMMUNICATION DEVICE

(75) Inventor: Dan Vassilovski, Del Mar, CA (US)

(73) Assignee: QUALCOMM Incorporated, San Diego, CA (US)

(*) Notice: Subject to any disclaimer, the term of this patent is extended or adjusted under 35 U.S.C. 154(b) by 50 days.

(21) Appl. No.: 11/563,050

(22) Filed: Nov. 24, 2006

(65) Prior Publication Data

US 2008/0122685 A1    May 29, 2008

(51) Int. Cl.
*G01S 5/14* (2006.01)
(52) U.S. Cl. ............... 342/357.09; 342/357.1; 455/456.1; 455/457
(58) Field of Classification Search .......... 342/357.1, 342/357.09; 455/456.1
See application file for complete search history.

(56) References Cited

U.S. PATENT DOCUMENTS

| | | | | |
|---|---|---|---|---|
| 6,185,427 | B1* | 2/2001 | Krasner et al. | 342/357.1 |
| 6,243,648 | B1* | 6/2001 | Kilfeather et al. | 455/456.1 |
| 6,670,915 | B1* | 12/2003 | McBurney et al. | 342/357.09 |
| 2004/0164893 | A1* | 8/2004 | Liou | 342/357.1 |
| 2005/0227705 | A1* | 10/2005 | Rousu et al. | 455/456.1 |
| 2005/0265313 | A1* | 12/2005 | Poikselka | 370/352 |
| 2006/0040693 | A1* | 2/2006 | Yoon et al. | 455/456.1 |
| 2007/0055445 | A1* | 3/2007 | Janky et al. | 701/213 |
| 2007/0216575 | A1* | 9/2007 | DiEsposti | 342/357.15 |
| 2007/0232242 | A1* | 10/2007 | Dunko | 455/90.2 |

FOREIGN PATENT DOCUMENTS

| | | |
|---|---|---|
| WO | 06002681 | 1/2006 |
| WO | 07114842 | 10/2007 |

OTHER PUBLICATIONS

International Search Report , PCT/US2007/085281 - International Search Authority - European Patent Office - Sep. 5, 2008.
Written Opinion, PCT/US2007/085281 - International Search Authority - European Patent Office - Sep. 5, 2008.
International Preliminary Report on Patentability, PCT/US2007/085281 - International Preliminary Examining Authority - European Patent Office, Feb. 13, 2009.

* cited by examiner

*Primary Examiner*—Thomas H Tarcza
*Assistant Examiner*—Fred H Mull
(74) *Attorney, Agent, or Firm*—Robert O'Connell; Raphael Freiwirth

(57) ABSTRACT

Systems, methods, device, apparatus, and machine-readable medium are described that provide for actuation of position determination in a wireless device based on a user input to an input mechanism associated with a group communication, such as a push-to talk and/or half-duplex communication. By marrying actuation of position determination with a user's request for push-to-talk communication (i.e., a request for a talk spurt in a PTT communication), the user is not required to perform any additional position determining initiating action to start the position determining process. In addition, the actuation of position determination is coupled with the initiation of another function on the wireless device, specifically, a push-to-talk request, which benefits from having accurate and current position data available for all current call members and/or a group administrator or the like.

39 Claims, 13 Drawing Sheets

METHODS AND APPARATUS FOR ACTUATED POSITION DETERMINATION IN A WIRELESS COMMUNICATION DEVICE

BACKGROUND

The disclosed aspects relate to position determination in wireless communication devices, and more particularly, to systems and methods for actuating position determination in a wireless communication device.

Wireless communication devices, such as mobile phones, pagers, handheld computers, etc., are becoming increasingly popular for both business and personal use. One advantage of such devices is their "wireless" aspect, allowing the devices to be utilized whenever and wherever a user desires. As the popularity of such devices increases, so too does functionality that is incorporated into the devices.

For example, some wireless communication devices are available that feature a group communication mode initiated, for example, by pressing a push-to-talk (PTT) or push-to-chat button on a group communications-enable cellular telephone. Such systems allow two or more individuals, each having a wireless communication device equipped with a requisite PTT communication mechanism, to communicate with other members of the group. For instance, a group communication system can rely on a single frequency, or dedicated channel, over which communications are received by the wireless communication devices. In some systems, only one member may transmit information to the other members at any given time. However, all members can listen to the dedicated broadcast channel to receive communications from the single member who is transmitting. A member desiring to transmit to other members of the system can send an access request by depressing the PTT button on the member's respective communication device that allows the member sole access to broadcasting on the dedicated channel. Pushing the button indicates the member's request for the "floor." If granted the floor, or talker permission, the member then speaks for a few seconds, after which the member releases the PTT button, and other speakers can request the floor and subsequently speak to the group.

Push-to-talk wireless communication devices, such as PTT-equipped cellular telephones and Land Mobile Radios (LMRs), have gained widespread use amongst various public service groups, such as police departments, fire departments, paramedics, and military branches. The group communication option prevalent in such systems allows for any and all of the members of such groups to stay in contact during emergency type situations.

In addition to push-to-talk communication, some wireless communication devices are equipped with position determination mechanisms, such as Global Positioning System (GPS) receivers or the like. GPS receivers provide for the reception of precise timing signals broadcasted from multiple GPS satellites. The timing signals allow for the accurate determination of device location, for instance, in terms of latitude and longitude coordinates.

However, one limitation of current positioning determination mechanisms is that the systems require a device user or a network entity, such as a network device or administrator, to provide an input to initiate the position determination process. In this regard, a user may be required to access a position determination application and provide a specific position determination initiating action to start the process. In the same regard, a network administrator may be required to establish communication with the wireless device before actuating the position determination process. The need for such superfluous action on behalf of the user or network administrator results in the user or network administrator forgetting or otherwise neglecting the need to update the position data, thus resulting in out-dated, inaccurate position data that reflects the previous location.

Additionally, in battery-powered wireless devices, position determination can be a power limiting process. Thus, performing position determination can be limited to situations and times that require such data. From a wireless device power standpoint, constantly and automatically executing position determination on a regularly scheduled basis is not desirable due to the drain on the battery. Therefore, position determination may be limited to only those specific instances in which a user or network entity benefits from or requires such data.

Therefore, a need exists to improve methods and systems for actuating position determination.

SUMMARY

The disclosed systems, apparatus, devices, methods, and machine-readable medium provide for an automatic actuation of position determination in a wireless communication device.

In particular, systems, apparatus, devices, methods, and machine-readable medium are presented that provide for actuation of position determination in a wireless device based on a user input to an input mechanism, such as a button, associated with push-to talk (PTT) or group communication call. By marrying actuation of position determination with a user's request for push-to-talk communication (i.e., a request for a talk spurt in a group communication), the user is not required to perform any additional position determining initiating action to start the position determining process. In addition, the actuation of position determination is coupled with another function in the wireless device, i.e. the initiation of push-to-talk or group communication, which benefits from having accurate and current position data available for all current call members and/or a group administrator or the like.

In one aspect, a method for actuating position determination in a wireless communication device is provided. The method includes receiving a user input for a push-to-talk communication and actuating position determination in response to receiving the user input for the push-to-talk communication. The user input for a push-to-talk communication, otherwise referred to as a push-to-transmit, push-to-chat, or group communication, includes engaging a designated button or input mechanism. It should be noted that the user input for a push-to-talk communication is not limited to engaging a button, and may include input to a touch pad/screen, voice commands, or any other suitable user input. In some aspects, actuating position determination may include transmitting a position request message to a position determination entity, such as a network server. The transmission of the position request message may occur in parallel, i.e., on separate channels, with the transmission of the group communication request or the transmission of the position request message may occur in sequence, either before or after communication of the group communication request.

In some aspects the method may further include obtaining position information from a position determination entity in response to actuating position determination and determining a wireless device position based on the obtained position information. Obtaining position information from a position determination entity may entail, for example, obtaining timing information from a satellite or obtaining position assistance information from a wireless network server. The determined wireless device position may include a geographic position, in terms of latitude and longitude coordinates, a pseudorange, a call point identifier, an access point identifier, a base station identifier, or any other suitable position data.

In a further aspect, an apparatus comprising a processor is provided. The processor is capable of receiving a user input for a push-to-talk communication and actuating position determination in response to receiving the user input for the push-to-talk communication.

In a different aspect, a machine-readable medium comprising instructions stored thereon is provided. The machine-readable medium includes instructions for receiving a user input for a push-to-talk communication and instructions for actuating position determination in response to receiving the user input for the push-to-talk communication.

In yet another aspect, a wireless communication device is provided. The wireless communication device includes a computer platform, an input mechanism, and a position actuation module. The computer platform includes a processor and a memory. The input mechanism is in communication with the processor and is operable to receive a user input to activate a push-to-talk communication. The position actuation module is stored in the memory and executable by the processor. The actuation module is operable to monitor for the user input to the input mechanism and to actuate position determination in response to receiving the user input to the input mechanism. The input mechanism may be a predefined button or keypad, a touch screen/pad display, a voice recognition module or the like. The device may further include a group communications module stored in the memory and executable by the processor. The group communications module is operable to monitor for the user input to the input mechanism and actuate a group communication request in response to receiving to the user input to the input mechanism.

The position actuation module may be further operable to transmit a position request message to a position determination entity, such as a network server. The wireless communication device may be configured such that the position request message and the group communication request are communicated in parallel over separate channels or in sequence. The position actuation module may be further operable to obtain position information from a position determination entity in response to actuating position determination, to obtain timing information from a satellite and/or to obtain position assistance information from a wireless network server. Further, the position actuation module may be operable to determine a wireless device position based on the obtained position information, timing information and/or position assistance information. The determined wireless device position may be a geographic position, a pseudorange, a call point identifier, an access point identifier, a base station identifier, or any other suitable positional data.

In another aspect, a wireless communication device is defined by a means for receiving a user input for a push-to-talk communication and a means for actuating position determination in response to receiving the user input for the push-to-talk communication.

In another aspect, a system for actuating position determination in a wireless communication device is provided. The system includes a wireless communication device and a position determination entity. The wireless communication device includes a computer platform, an input mechanism, and a position actuation module. The computer platform includes a processor and a memory. The input mechanism is in communication with the processor and is operable to receive a user input to activate a push-to-talk communication.

The position actuation module is stored in the memory and is executable by the processor. The position actuation module is further operable to monitor for a user input to the input mechanism and to actuate position determination in response to receiving the user input to the input mechanism. The position determination entity is operable to provide position determination information to the wireless communication device.

In one aspect the position determination entity comprises a satellite in communication with the wireless communication device and operable to transmit timing information to the wireless communication device. In an alternate aspect, the position determination entity comprises a wireless network server in communication with the wireless communication device and operable to transmit position assistance information to the wireless communication device.

Thus, the present aspects provide for systems, methods, devices, apparatus, and machine-readable medium that provide for actuation of position determination in a wireless device based on a user input to an input mechanism associated with a push-to-talk or group communication. By marrying actuation of position determination with a user's request for push-to-talk communication (i.e., a request for a talk spurt in a PTT communication) the user is not required to perform any additional position determining initiating action to start the position determining process. In addition, the actuation of position determination is coupled with the initiation of another function on the wireless device, specifically a push-to-talk request, which benefits from having accurate and current position data available for all current call members and/or a group administrator or the like. Therefore, present aspects provide for systems, methods, devices, apparatus, and machine-readable medium wherein position determination is actuated without requiring extraneous actions on behalf of the user or the network while accurate and current positional data is provided to push-to-talk communication participants and/or associated administrators.

BRIEF DESCRIPTION OF THE DRAWINGS

The disclosed aspects will hereinafter be described in conjunction with the appended drawings, provided to illustrate and not to limit the disclosed aspects, wherein like designations denote the elements, and in which.

DETAILED DESCRIPTION

The present systems, devices, apparatus, methods, and machine-readable medium will be described in more detail hereinafter with reference to the accompanying drawings, in which aspects of the invention are shown. The systems, devices, apparatus, methods, and machine-readable medium, however, may be embodied in many different forms and should not be construed as limited to the aspects set forth herein; rather, the present aspects are provided so that the subject disclosure will be thorough and complete, and will convey the scope of the invention to those skilled in the art. Like numbers refer to like elements throughout.

Figure 1:
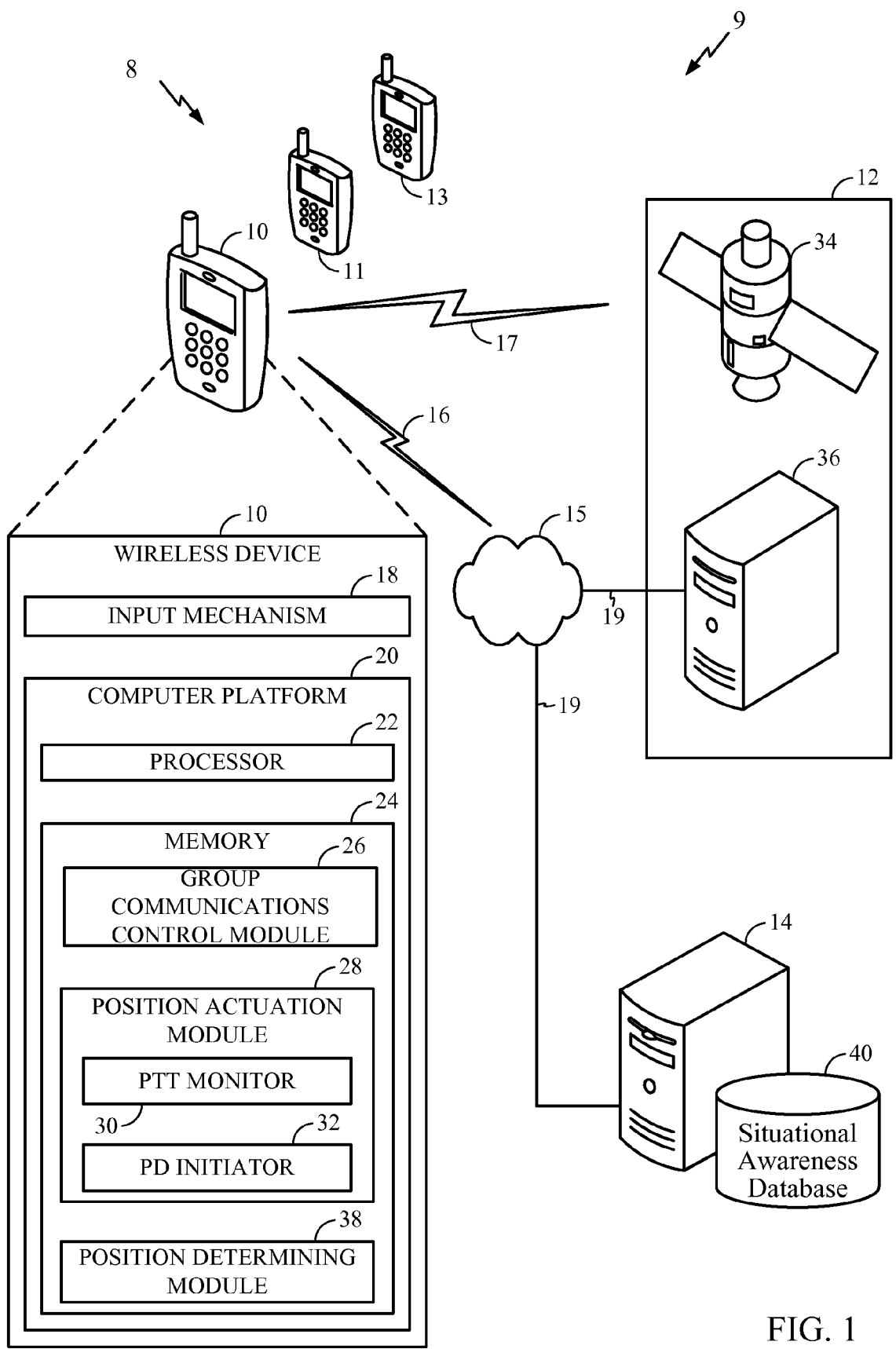
FIG. 1 is a schematic representation of a system for actuating position determination based on group communication requests, according to one aspect.

According to one aspect, FIG. 1 provides a schematic diagram representation of a system 9 for actuating position determination based on a push-to-talk or group communication. The system 9 includes a wireless communication device 10 (herein also referred to as "wireless device"), a position determination entity 12, and a group communications server 14 that are in communication via a communications network 15, such as one or some combination of a wireless network 16 and/or a satellite radio network 17 and/or a wired network 19. The wireless device 10 includes an input mechanism 18 for initiating a push-to-talk or group communication. For example, wireless device 10 and group communications server 14 may be equipped with the QChat™ technology available from Qualcomm, Incorporated of San Diego, Calif. Push-to-talk or group communication is used herein to describe, at least, any and all half-duplex communications and includes one-to-many or group communications as well as one-to-one communications initiated via a push-to-talk input mechanism on the device. The input mechanism 18 may typically comprise a button that is engaged and held to initiate a talk spurt. The talk spurt allows the wireless device user the ability to speak over the communication line to the other members of the group communication call. While a button is the typical input mechanism, other input mechanisms such as voice recognition, key or keypad, touch screen or the like may also define the input mechanism.

The wireless device 10 additionally includes a computer platform 20 that includes a processor 22 operable for executing modules, routines, programs and the like, and a memory 24 operable for storing modules, routines, programs and the like. The memory 24 includes a group communications control module 26 operable for recognizing a user-input to input mechanism 18 and, in response, communicating a group communication request to the group communications server 14. The memory 24 also includes a position actuation module 28 that includes a push-to-talk monitor 30 and a position determination initiator 32. The push-to-talk monitor 30 is operable for monitoring a user-input to the input mechanism 18 that initiates the push-to-talk communication. The position determination initiator 32 is operable for actuating position determination in response to a user-input to the input mechanism 18. Actuating position determination may include calculating a geographic position based on measurements of timing signals received from GPS satellites and/or communicating a position determination request to the position determining entity 12. In the case of communicating a request, the position determining entity 12 may be defined by a network device, such as a position assistance/determining server 36 operable for communicating position assistance data to the wireless device 10 or the like. The wireless device 10 may additionally include a position determining module 38 operable for determining the position of the wireless device 10 based on the received timing and/or assistance information. In alternate aspects, in which the wireless device 10 does not include a position determining module 38 or position determination capabilities reside external to the wireless device, determination of the wireless device position may be accomplished at a network device, such as the position assistance/determining server 36 or the like.

Once the position of the wireless device 10 is determined, the position information may be communicated to a network entity responsible for tracking the position of all members 8, for example, wireless devices 10, 11 and 13, of the group communication call. In one aspect, a situational awareness database 40 may define the network entity responsible for tracking caller positions. In the illustrated aspect of FIG. 1, the situational awareness database 40 is associated with the group communications server 14. However, in alternate aspects, the situational awareness database 40 may be associated with the position assistance/determining server 36 or any other network device in communication with wireless network 16.

Thus, system 9 provides apparatus and methods for automatically determining and tracking the position of one or more wireless devices based on actuation of the push-to-talk input mechanism during a group communication call. System 9 thereby allows for the efficient and involuntary determination of wireless device position without requiring a device user or network administrator to actively and repetitively make position requests. Thus, system 9 provides for updated wireless device position information within the current infrastructure in a simple and readily-implemented manner.

Figure 2:
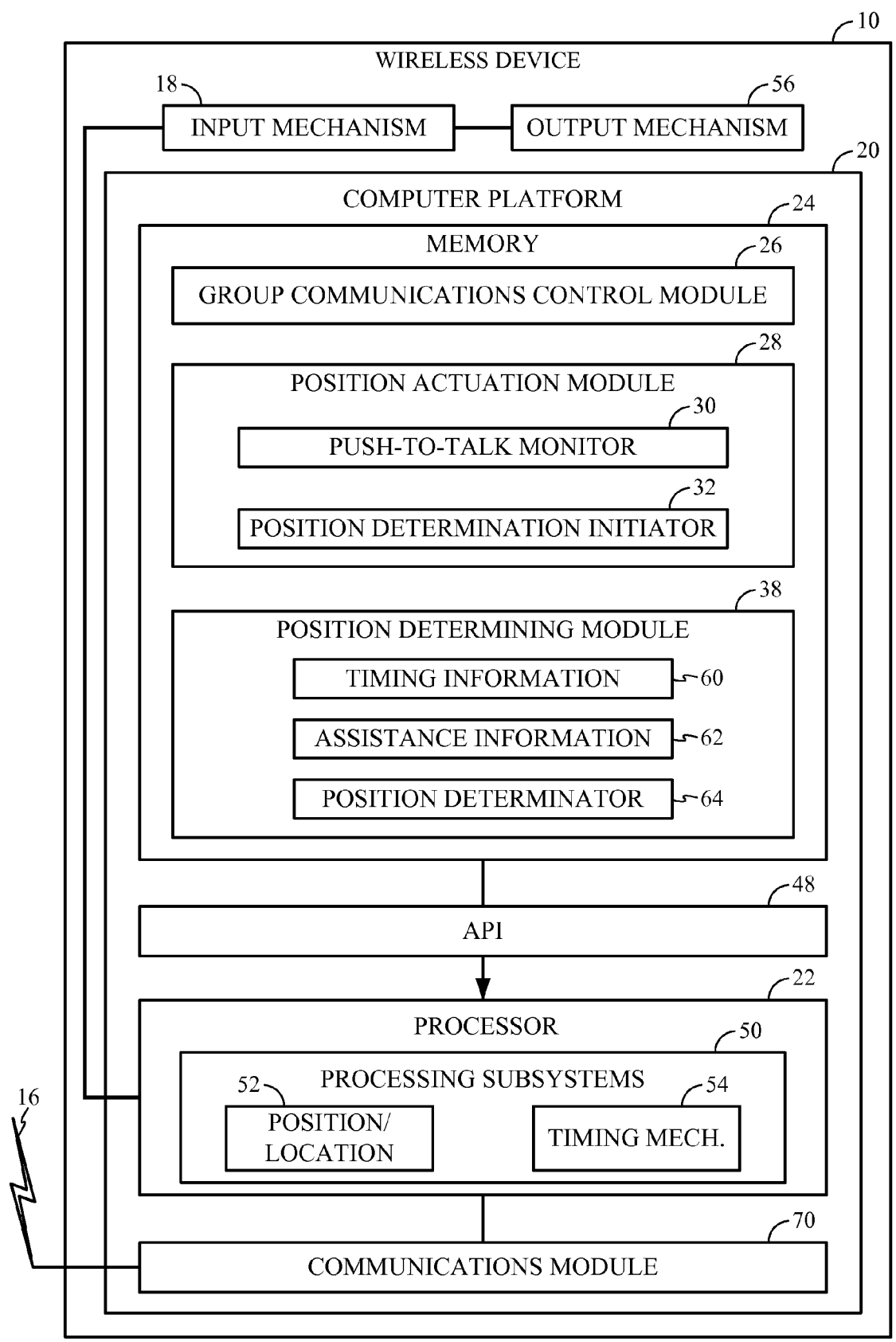
FIG. 2 is a block diagram of a wireless communication device for actuating position determination based on group communication requests, according to one aspect.

Referring to FIG. 2, according to one aspect, a block diagram representation of a wireless communication device 10 operable for providing actuated position determination, is depicted. It should be noted, however, that wireless devices 11 and 13 may have identical and/or similar functional components. The wireless communication device 10 may include any type of computerized, wireless communication device, such as cellular telephone, Personal Digital Assistant (PDA), two-way text pager, portable computer, and even a separate computer platform that has a wireless communications portal, and which also may have a wired connection to a network or the Internet. The wireless communication device can be a remote-slave, or other device that does not have an end-user thereof but simply communicates data across the wireless or wired network, such as remote sensors, diagnostic tools, data relays, and the like. The present aspects can accordingly be implemented on any form of wireless communication device or wireless computer module, including a wireless communications portal, including without limitation, wireless modems, Peripheral Component Microchannel Interconnect Architecture (PCMCIA) cards, access terminals, wireless computers or any combination or sub-combination thereof.

The wireless communication device 10 includes computer platform 20 that can transmit data across a wireless or wired network. The computer platform 20 can further receive and execute routines and applications and optionally display data transmitted from network devices, such as the positional assistance/determining server 36, group communications server 14, or another computer device connected to wireless network 16. Computer platform 20 includes the memory 24, which may comprise volatile and nonvolatile memory such as read-only and/or random-access memory (RAM and ROM), erasable programmable read-only memory (EPROM), Electrically Erasable Programmable Read-Only Memory (EEPROM), flash cards, or any memory common to computer platforms. Further, memory 24 may include one or more flash memory cells, or may be any secondary or tertiary storage device, such as magnetic media, optical media, tape, or soft or hard disk.

Still further, computer platform 20 also includes a processor 22, which may be an application-specific integrated circuit ("ASIC"), or other chipset, processor, logic circuit, or other data processing device. Processor 22 may execute an application programming interface ("API") layer 48 that interfaces with any resident programs, such as group communications control module 26 and/or position actuation module 28, stored in the memory 24 of the wireless device 10. API 48 can be a runtime environment executing on the respective wireless device. One such runtime environment is Binary Runtime Environment for Wireless® (BREW®) software developed by Qualcomm, Incorporated of San Diego, Calif. Other runtime environments may be utilized that, for example, operate to control the execution of applications on wireless computing devices.

Processor 22 includes various processing subsystems 50 embodied in hardware, firmware, software, and combinations thereof, that enable the functionality of wireless communication device 10 and the operability of the wireless communication device 10 on a wireless network 16. For example, processing subsystems 50 allow for initiating and maintaining communications, and exchanging data, with other networked devices. In one aspect, in which positional determination relies on subsystems to provide positional data, time data, and the like, the processing subsystems 50 may include, but not limited to, a position/location subsystem 52, which may include, for example, some portion of the gpsOne® position-location technology available from Qualcomm, Incorporated of San Diego, Calif., timing mechanisms 54, and the like. In aspects in which wireless communication device 10 is defined as a cellular telephone, the communications processor 22 may additionally include one or a combination of processing subsystems 50, such as: sound, non-volatile memory, file system, transmit, receive, searcher, layer 1, layer 2, layer 3, main control, remote procedure, handset, power management, digital signal processor, messaging, call manager, Bluetooth® system, position engine, user interface, sleep, data services, security, authentication, Universal Subscriber Identity Module (USIM)/Subscriber Identity Module (SIM), voice services, graphics, universal serial bus (USB), multimedia such as Moving Picture Experts Group (MPEG), General Packet Radio Service (GPRS), etc. (all of which are not individually depicted in FIG. 2 for the sake of clarity). For the disclosed aspects, processing subsystems 50 of processor 22 may include any subsystem components that interact with applications executing on computer platform 20.

Additionally, wireless communication device 10 has input mechanism 18 for generating inputs into wireless communication device, such as a push-to-talk initiation input, commonly referred to as a push-to-talk spurt. As previously noted, the input mechanism for push-to-talk initiation is defined by a button or key that is engaged and held to gain control over the half-duplex communication channel, thus allowing the device user request the floor and talk over to the group communication channel. Additionally, the input mechanism for push-to-talk initiation may include any other keypad function, a microphone for voice recognition, a touch screen display, or the like. In addition to input mechanisms 18, the wireless device 10 may include output mechanism 56 for generating information for consumption by the user of the wireless communication device 10. For example, output mechanism 56 may include a display, an audio speaker, a haptic feedback mechanism, etc.

The memory 24 of computer platform 20 includes group communications control module 26 operable for recognizing a user-input to input mechanism 18 and, in response to recognizing the user-input, communicating a group communication request to a network device, such as the group communications server 14 shown in FIG. 1. The group communication request may include a request to set-up and/or initiate a group call, and/or a request for the floor during an on-going group call, and/or a request to terminate participation in a group call and/or a request to terminate the group call.

The memory 24 also includes the position actuation module 28 that includes the push-to-talk monitor 30 and the position determination initiator 32. The push-to-talk monitor 30 is operable for monitoring a user-input to the input mechanism 18 that initiates the push-to-talk communication. The position determination initiator 32 is operable for actuating position determination in response to a user-input to the input mechanism 18. The act of actuating position determination may include communicating a position determination request to the position determining entity 12, such as position assistance/determining server 36 shown in FIG. 1, or receiving timing signals from satellite 34, wherein the timing signals are operable for determining a location/position. The position determination initiator 32 may be configured such that all user-inputs to the push-to-talk request input mechanism result in initiation of location determination. Alternatively, the position determination initiator 32 may be configured to limit, in any manner, the initiation of position determination requests during a group communication call. For example, position determination initiator 32 may include a configuration that limits position determination requests to a predetermined number of user-inputs (e.g., the first three user-inputs), a predetermined number of inputs in a predetermined time period (e.g. only one user-input per minute), etc. In other instances, the position determination initiator 32 may be configured to limit position determination requests to situations where the push-to-talk communication occurs if the wireless communication device has been determined to have changed geographic position. For example, in this case, position determining module 38 may be in communication with position/location subsystem 52, which may have updated position information, for example, based on the execution of another application that utilizes such information. As such, position determining module 38 may be able to determine that wireless communication device 10 has changed position since the last user input into input mechanism 18.

The wireless communication device 10 may additionally include a position determining module 38 operable for determining the position of the wireless device 10. In some aspects, the position determining module 38 may utilize timing information 60 communicated from satellite 34 to determine the position of the wireless communication device 10. Additionally, in other aspects, the position determining module 38 may utilize assistance information communicated from a network device, such as position assistance/determining server 36, to determine the position of the wireless communication device 10. The position determining module 38 may further include a position determinator 64 comprising a function or routine operable for determining, at the wireless device 10, the position of the wireless device. In alternate aspects, such as when the wireless device 10 does not include a position determining module 38 or position determination capabilities reside external to the wireless device, determination of the wireless device position may be accomplished at a network device, such as position assistance/determining server 36 or the like, which may communicate the position information to the wireless communication device 10 and/or to a network device, such as group communications server 14 and/or situation awareness database 40.

The computer platform 20 may further include a communications module 70 embodied in hardware, firmware, software, or combinations thereof, that enables communications among the various components of the wireless communication device 10, as well as between the wireless communication device 10 and the communication network 15. The communications module 70 may further include the requisite hardware, firmware, software and/or combinations thereof for establishing a wired or wireless communication connection. Additionally, the communications module 70 is operable for communicating group communication requests, position determination initiation requests, and any other communications related to push-to-talk communication or position determination. In one aspect, the group communication requests and the position determination initiation requests are communicated in sequence on the same communication channel. In an alternate aspect, the group communication requests and the position determination initiation requests are communicated in parallel on separate communication channels. In addition, the communications module 70 will receive push-to-talk communications from the network, timing information from satellites, position determination assistance information from network devices, and any other communications related to push-to-talk communication or position determination. The communications module 70 may also be operable to provide communication positional data to a central network entity, such as a situational awareness database 40, shown in FIG. 1.

Figure 3:
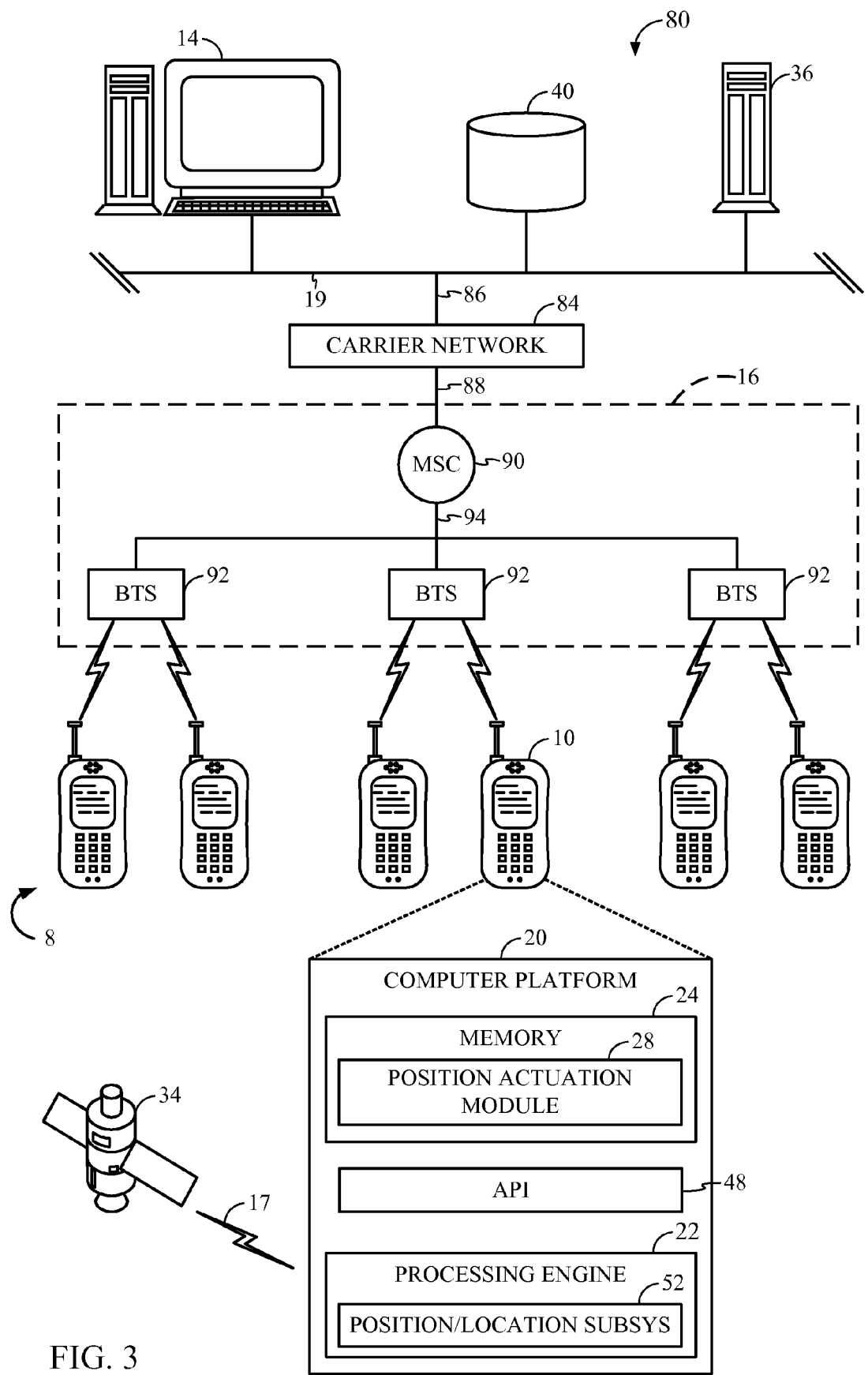
FIG. 3 is a block diagram of a wireless communication network for implementing actuated position determination based on group communication requests, according to another aspect.

Referring to FIG. 3, in one aspect, wireless communication device 10 for monitoring voice quality comprises a cellular telephone. A cellular telephone system 80 may include wireless network 16 connected to wired network 19 via a carrier network 84. Wireless devices 10 are being manufactured with increased computing capabilities and often can communicate packets including voice and data over wireless network 16. As described earlier, such "smart" wireless devices 10 have APIs 48 resident on the wireless devices' local computer platforms 20. The APIs 48 allow software developers to create software applications that operate on the wireless device 10, and control certain functionality on the wireless device 10. In one aspect, the wireless devices 10 may store in memory 24 the position actuation module 28 that is operable for actuating position determination based on user-inputs to a push-to-talk communication input mechanism. The position actuation module 28 may operate in conjunction with position/location subsystem 52 to communicate with GPS satellites 34 via low power radio or satellite network 17 and/or network-based entities, such as position assistance/determining server 36, via the wireless network 16 and/or the wired network 19.

FIG. 3 is a representative diagram that illustrates, in more detail, the components of a cellular wireless network and the interrelation of the elements of one aspect of the present system. Cellular telephone system 80 is merely exemplary and can include any system whereby remote modules, such as wireless devices 10 communicate over-the-air between and among each other and/or between and among components of a wireless network 16, including, without limitation, wireless network carriers and/or servers.

In the cellular telephone system 80, a network device, such as group communications server 14, can be in communication over a wired network (e.g. a local area network (LAN), etc.) with a separate data repository 40 for storing the situational awareness data or additional location-related data for the devices in one or more call groups and/or for one or more wireless devices. Further, position assistance/determining server 36 may be in communication with group communications server 14 to provide position assistance data to the wireless devices, determine wireless position, and/or provide for other position determining services. Group communications server 14, situational awareness database 40, and position assistance/determining server 36 may be present on the cellular telephone system 80 with any other network components that are needed to provide push-to-talk/group communication services and/or cellular telecommunication services. Group communications server 14, and/or position assistance/determining server 36 communicate with carrier network 84 through data links 86 and 88, which may be data links such as the Internet, a secure LAN, wide area network (WAN), or other network. Carrier network 84 controls messages (generally being data packets) sent to a mobile switching center ("MSC") 90. Further, carrier network 84 communicates with MSC 90 by a network 88, such as the Internet, and/or (plain old telephone service) (POTS). In network 88, a network or Internet portion transfers data, and the POTS portion transfers voice information. MSC 90 may be connected to multiple base stations ("BTS") 92 by another network 94, such as a data network and/or Internet portion for data transfer and a POTS portion for voice information. BTS 92 ultimately broadcasts messages wirelessly to the wireless devices, such as wireless devices 10, such as by short messaging service ("SMS") or other over-the-air methods.

Referring to FIGS. 4-7, shown are message flow diagrams detailing the wireless communication device location determination in four different modes of operation. It should be noted that the modes detailed in FIGS. 4-7 are by way of example only and any other location determination process or mode may be used once actuation of location determination is initiated in accordance with the aspects herein described.

Figure 4:
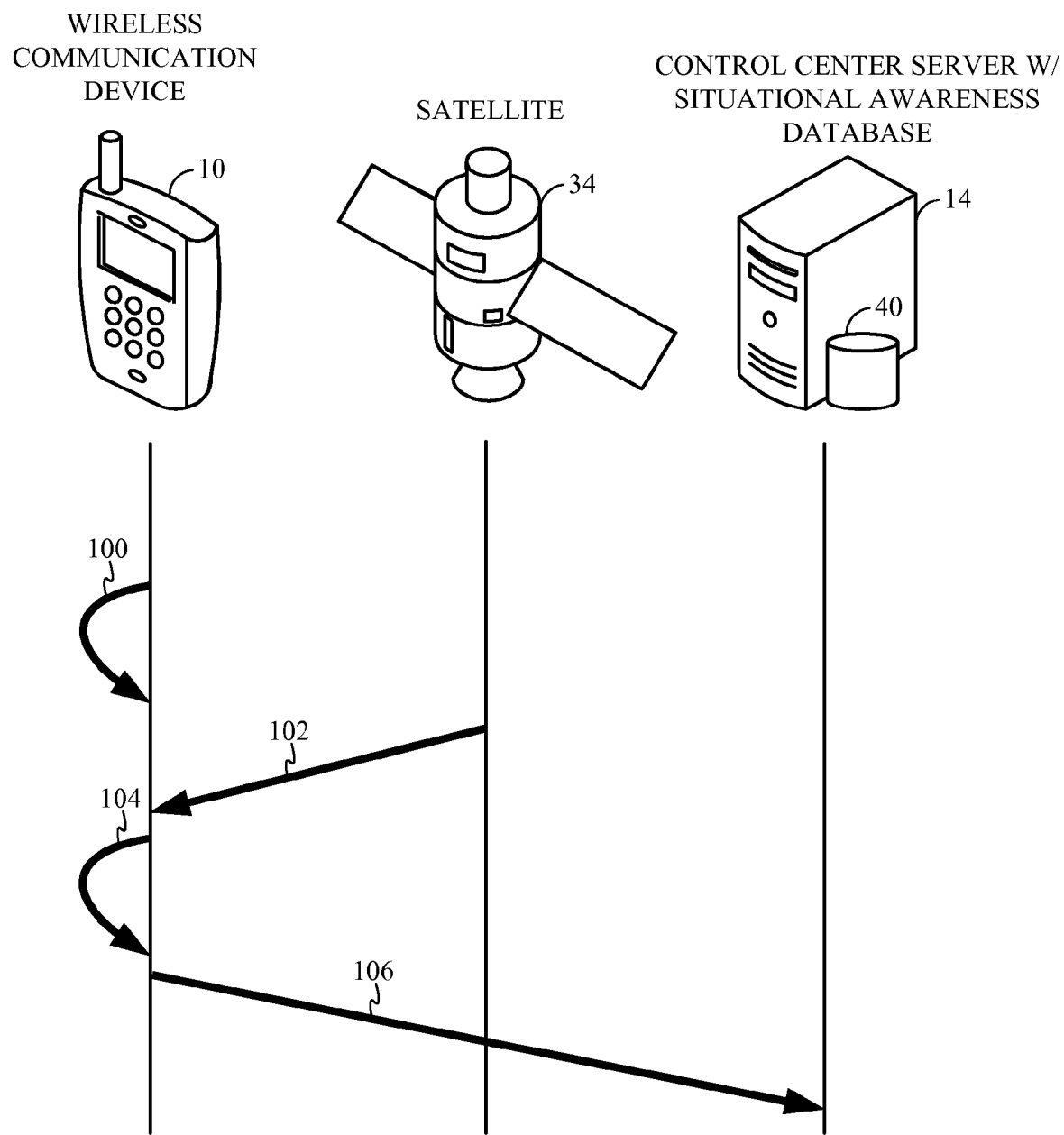
FIG. 4 is a message flow diagram of a Stand Alone Mode, Global Position System (GPS)-only position determination in a wireless communication device, according to one aspect.

FIG. 4 depicts a message flow diagram for a wireless device-based standalone Global Positioning System (GPS) mode of location determination. In the wireless device-based standalone GPS mode of operation, location determination is performed using only GPS data. That is, no network assistance data is required. At Event 100, the wireless device (10) receives a user input for a push-to-talk communication prompting a request for a push-to-talk communication. The user input for the push-to-talk communication additionally results in actuation of the position determination process. At Event 102, actuation of the position determination process results in wireless device (10), receiving timing signals broadcasted from GPS satellites (34) At Event 104, the wireless device uses the timing information and executes a position determining function (64) to determine a device position. In the subject aspect, the position of the wireless device has been determined without requiring assistance from the wireless network. At Event 106, the wireless device (10) may optionally communicate the device position to a network entity for distribution to a centralized database, such as situational awareness database (40) or distribution to other members of the push-to-talk/group communication.

Figure 5:
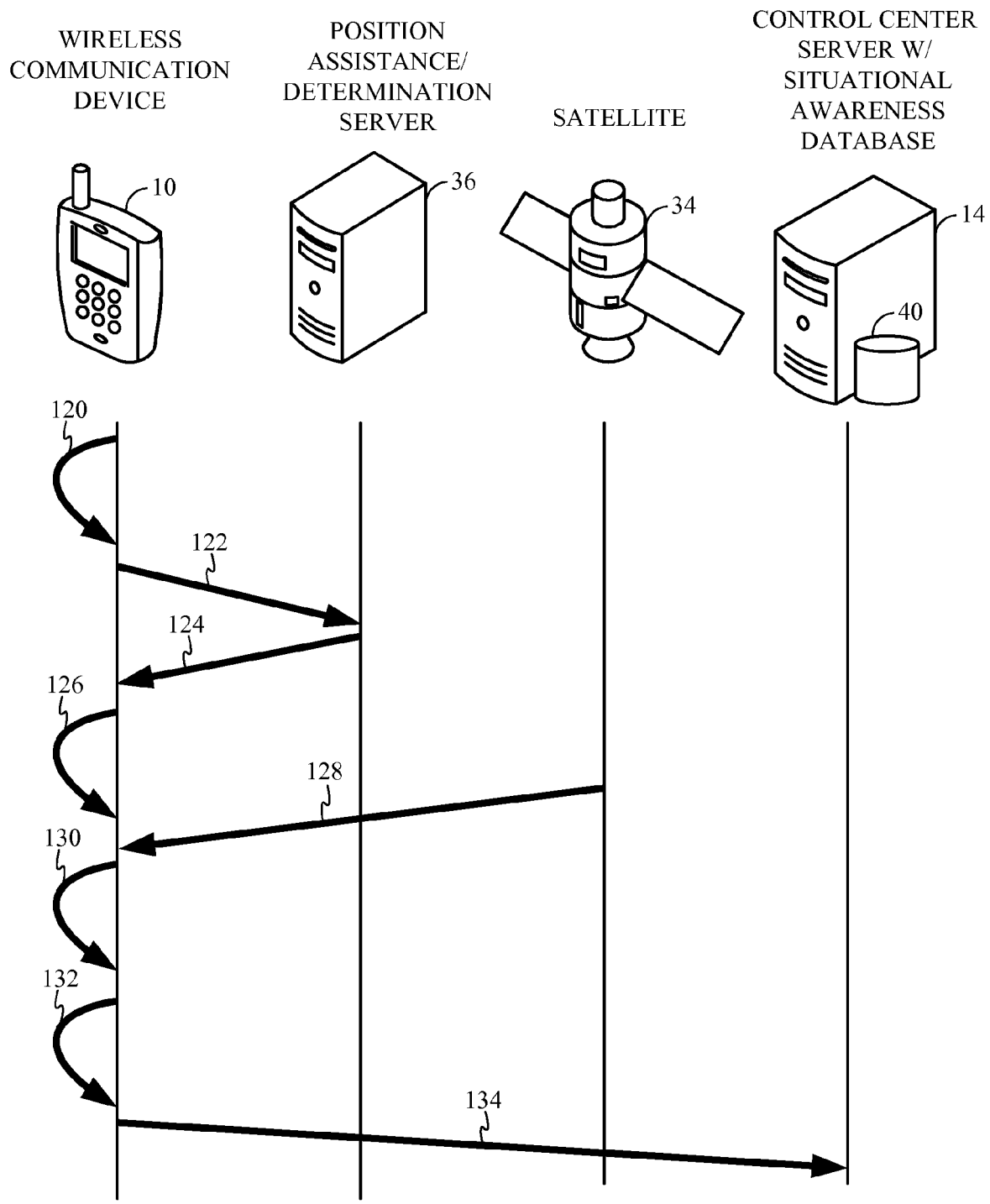
FIG. 5 is a message flow diagram of a Wireless Device-Based Mode, position determination using network assistance information and position determined at the wireless device, according to another aspect.

FIG. 5 depicts the message flow diagram for a wireless device-based network-assisted mode of location determination in which network devices assist the wireless device (10) in determining the wireless communication device's location. At Event 120, the wireless device (10) receives a user input for a push-to-talk communication prompting a request for a push-to-talk communication. The user input for the push-to-talk communication additionally results in actuation of the position determination process. At Event 122, actuation of the position determination process results in communication of a position assistance request to position assistance/determining server (36) and, in response to the position assistance request, at Event 124, the position assistance server communicates assistance information (62) to the wireless device. The assistance information may include, but is not limited to, the number of GPS satellites, which GPS satellites to listen to, timing information related to the satellite codes, Doppler information, and the like. At Event 126, the wireless device (10) uses the assistance information (62) to set the parameters for receiving GPS signals and, at Event 128, the wireless device (10) receives the timing signals broadcasted from GPS satellites (34). At Event 130, the wireless device (10) decodes the GPS signals, which in some aspect may include using the assistance information (62) to aid in setting the decoded parameters. At Event 132, the wireless device (10) uses the timing information received from the GPS satellites (34) and uses the position determinator (64) to determine a device position, which in some aspects may include using the assistance information (62). At Event 134, the wireless device (10) may optionally communicate the device position to a network entity for distribution to a centralized database, such as situational awareness database (40) or distribution to other members of the push-to-talk/group communication.

Figure 6:
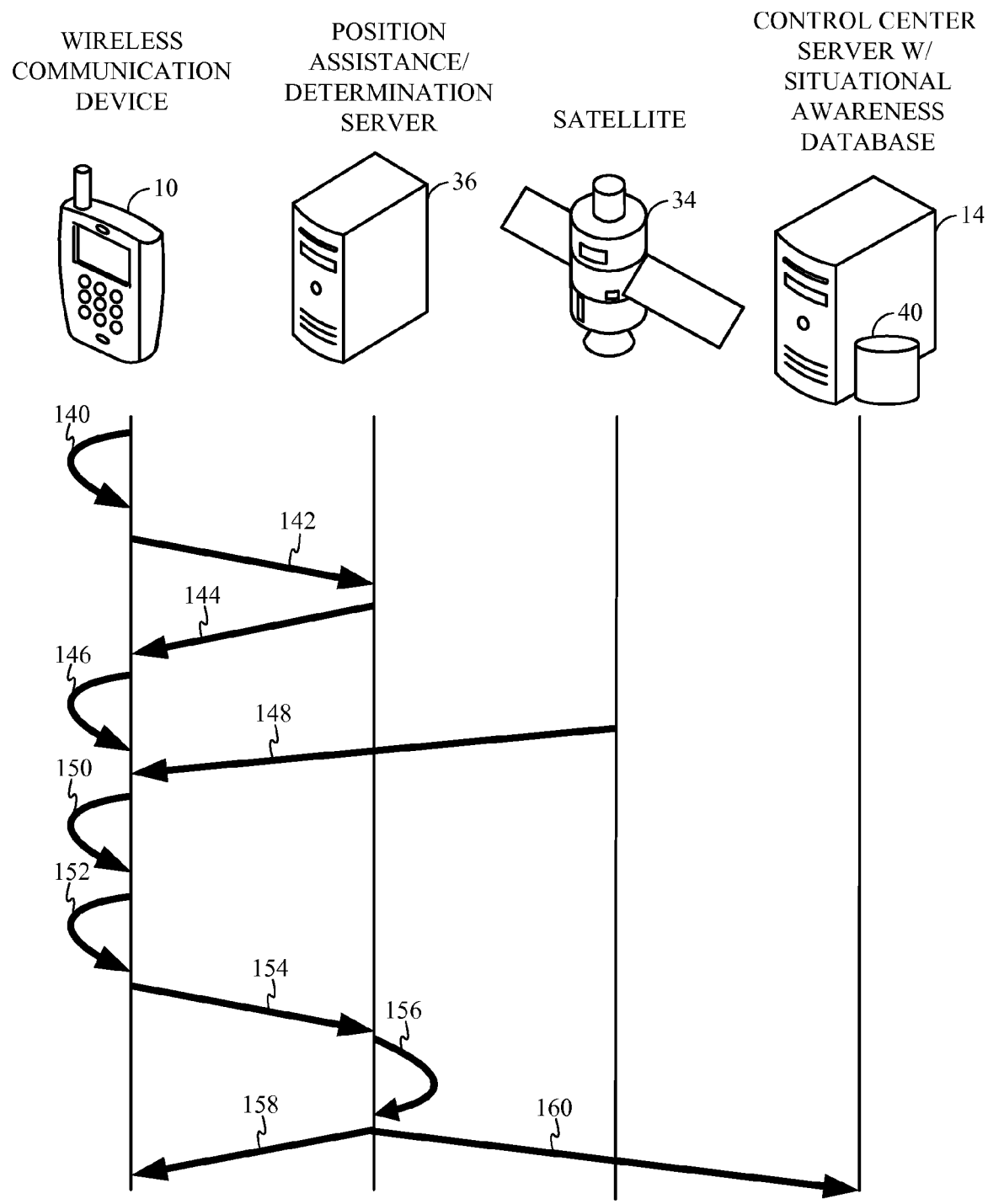
FIG. 6 is a message flow diagram of Wireless Device-Assisted Mode, position determination using network assistance information and position determined at a network entity, according to another aspect.

FIG. 6 depicts the message flow diagram for a network-based mode of location determination. In the network-based mode, the wireless device position is determined at a network entity, or is based on network information. At Event 140, the wireless device (10) receives a user input for a push-to-talk communication prompting a request for a push-to-talk communication. The user input for the push-to-talk communication additionally results in actuation of the position determination process. At Event 142, actuation of the position determination process results in communication of a position assistance request to position assistance/determining server (36). In one aspect, in response to the position assistance request, at Event 144, the position assistance server communicates assistance information (62) to the wireless device. The assistance information may include, but is not limited to, the number of GPS satellites, which GPS satellites to listen to, timing information related to the satellite codes, Doppler information, and the like.

At Event 146, in one aspect, the wireless device (10) uses the assistance information (62) to set the parameters for receiving GPS signals and, at Event 148, the wireless device (10) receives the timing signals broadcasted from GPS satellites (34). At Event 150, the wireless device (10) decodes the GPS signals, which may include using the assistance information (62) to aid in setting the decoded parameters. At Event 152, the wireless device (10) uses the decoded timing information to make measurements related to the distance from the GPS satellites. At Event 154, the wireless device (10) communicates the measurement information to a network device, such as a position assistance/determining server (36). At Event 156, the network device uses the measurement information and executes a position determining function, which may be similar to the function provided by position determinator 64, to determine a device position. At Event 158, the network device may optionally communicate the device position to the wireless device or, at Event 160, the network device may communicate the device position to a centralized control center server, such as a server associated with a situational awareness database or it may communicate the device position to the other members of the push-to-talk/group communication call (not shown in FIG. 6).

In an alternative aspect, all of the above Events may not occur if the position determination is based solely on network-based information. For example, at Event 144, one or more network entities may communicate assistance information to wireless device (10), where the assistance information may comprise network-based timing information and/or network entity identifiers. For example, the network-based timing information may be timing signals between the wireless device and a plurality of network entities, where these timing signals may be used to determine a wireless device location. Further, in this example, the wireless device (10) may calculate the wireless device's position based on the network-based timing signals utilizing a position determining function, or the wireless device (10) may pass the measurements on to a network entity for performance of the calculation and returning of the position information. In another example, the network identifiers may include base station identifiers, cell identifiers, or any other network entity identifier that may be associated with a location, and thus which may be utilized to determine a general location of wireless device (10). Further, in the latter example, the network identifiers may thereby comprise or be associated with the device location information.

Figure 7:
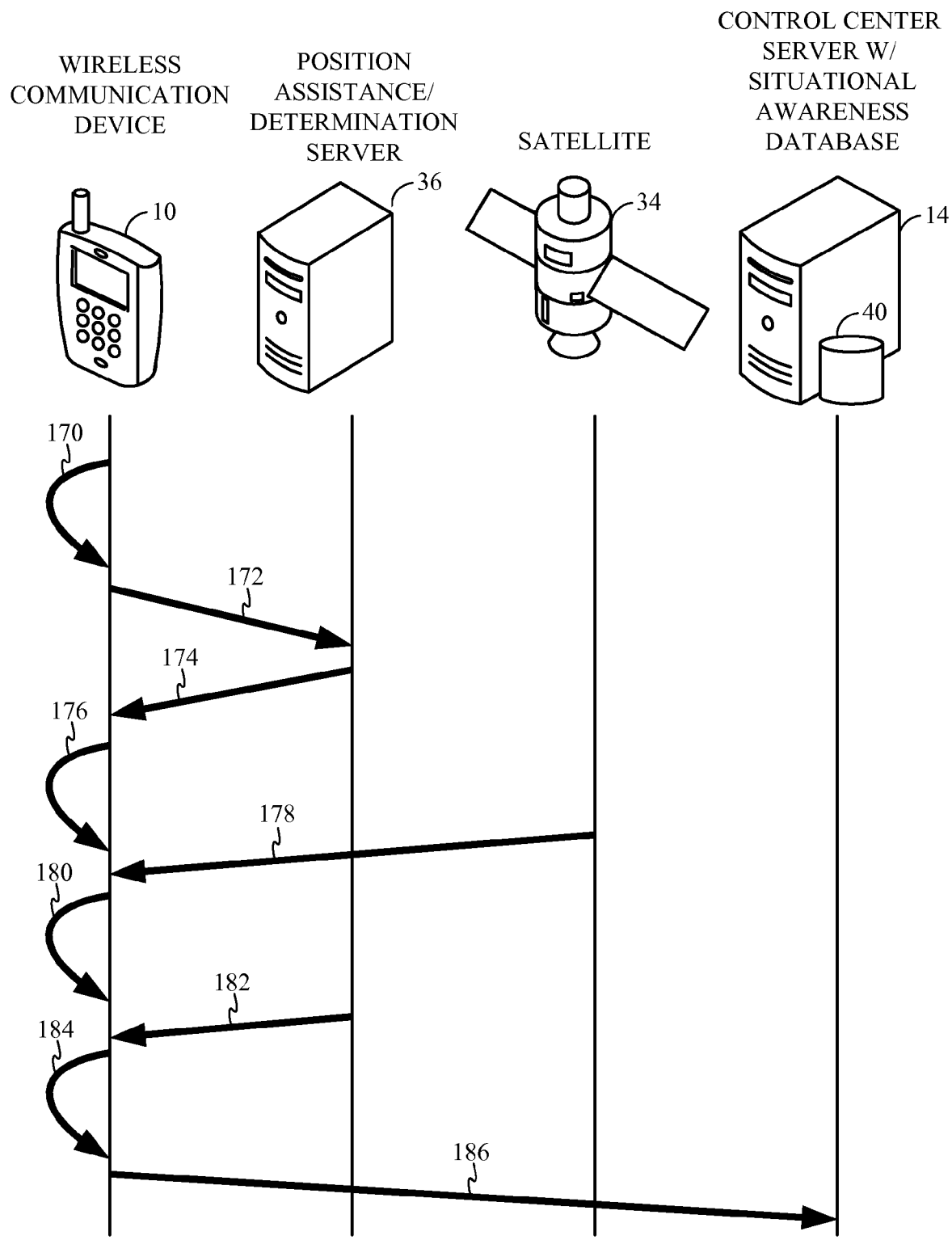
FIG. 7 is a message flow diagram of Wireless Device-Assisted/Hybrid Mode, position determination using network information and network assistance information and position determined at the wireless device, according to another aspect.

FIG. 7 depicts the message flow diagram for a wireless device-based assisted/hybrid mode of location determination. In the assisted/hybrid mode the wireless network information is added to GPS measurements as part of the position calculation for increased positioning reliability. At Event 170, the wireless device (10) receives a user input for a push-to-talk communication prompting a request for a push-to-talk communication. The user input for the push-to-talk communication additionally results in actuation of the position determination process. At Event 172, actuation of the position determination process results in communication of a position assistance request to position assistance/determining server (36) and, in response to the position assistance request, at Event 174, the position assistance server communicates assistance information (62) to the wireless device. The assistance information (62) may include, but is not limited to, the number of GPS satellites, which GPS satellites to listen to, timing information related to the satellite codes, Doppler information, and the like.

At Event 176, the wireless device (10) uses the assistance information (62) to set the parameters for receiving GPS signals and, at Event 178, the wireless device (10) receives the timing signals broadcasted from GPS satellites (34). At Event 180, the wireless device (10) decodes the GPS signals using the assistance information (62) to aid in setting the decoded parameters. At Event 182, wireless network information, which may include one or more components similar to the assistance information and ranging information, is communicated from a network device, such as a position assistance/determination server (36). At Event 184, the wireless device (10) uses the decoded timing information and the wireless network information to calculate a device position. At Event 186, the wireless device (10) may optionally communicate the device position to a network device, such as a control center server associated with a situational awareness database or it may communicate the device position to the other members of the push-to-talk/group communication call (not shown in FIG. 7).

Figure 8:
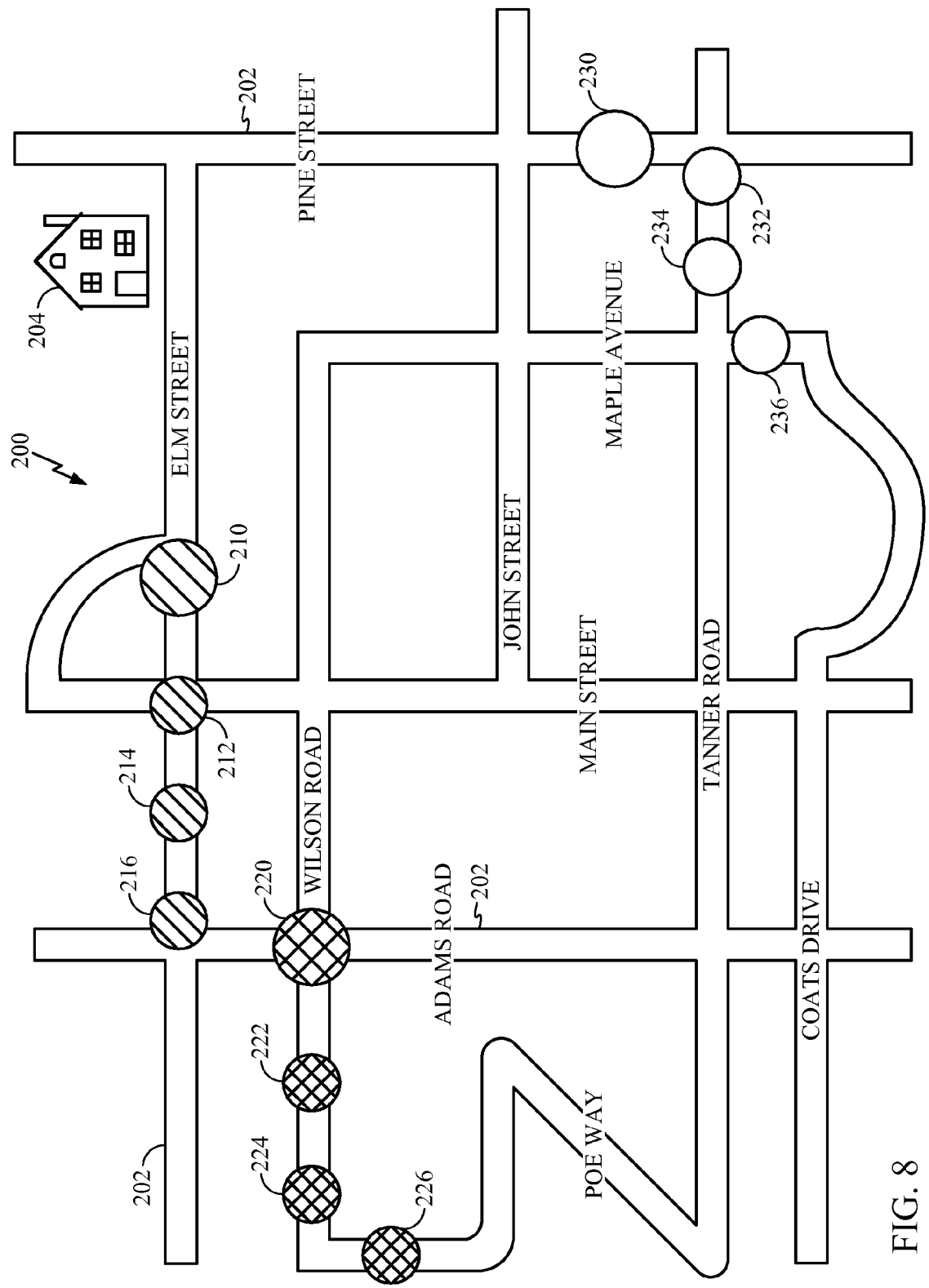
FIG. 8 is a graphical user-interface representation of location tracking of members of a push-to-talk group communication, according to one aspect.

According to one aspect, FIG. 8 is an example of a tracking map that may be displayed on a wireless device display or displayed at a network control center. FIG. 8 further provides an example of one implementation wherein position/location information is provided to group call users and/or control center administrators. Of course, FIG. 8 should not be construed as limiting. Other presentations of position/location are feasible and contemplated and within the purview of the present aspects. The map 200 is comprised of a grid of streets 202 and may be stored at the wireless device/network device and updated via an Internet connection. In the illustrated aspect, three wireless device users, for example, volunteer firefighters, are participating in a push-to-talk/group communication and responding to an emergency request at house 204. The current positions of the three wireless device users are represented by the large circular shaped icons 210, 220 and 230. In accordance with one aspect, the current positions may be associated with the most current request for the floor of a group communication call on each of the three users' wireless devices. The small circular shaped icons 212, 214, 216, 222, 224, 226, 232, 234 and 236 are associated with a respective large circular shaped icon 210, 220, and 230, and represent previous positions of each wireless device user. In accordance, with one aspect, the three previous positions may be associated with the three previous requests for the floor of a group communication call (excluding the most current request) on each of the users' wireless devices. For example, a user having a current position represented by large icon 210 previously was located at positions represented by small icons 212, 214 and 216. Similarly, a user having a current position represented by large icon 220 previously was located at positions represented by small icons 222, 224 and 226 and a user having a current position represented by large icon 230 previously was located at positions represented by small icons 232, 234 and 236. The illustrated example provides the user, such as a call participant or a network administrator, with the ability to locate one or more group call participants, and/or track the routes taken by call participants, and/or to track the progress of the call participants as the call participants move closer to a desired locale.

Figure 9:
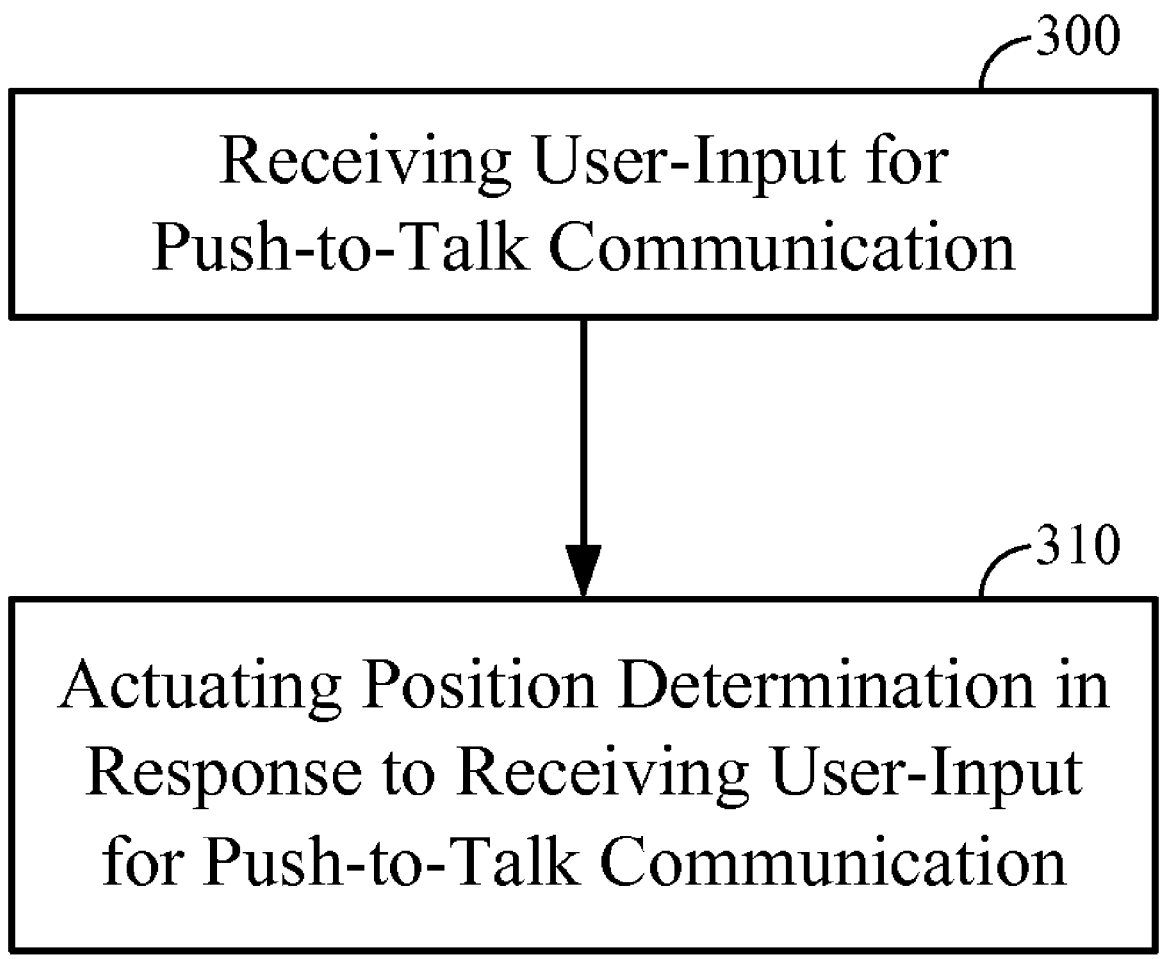
FIG. 9 is a flow chart of a method for actuating position determination based on group communication requests, according to one aspect.

Referring to FIG. 9, a flow diagram is depicted that represents a method for actuating position determination in a wireless device. At Event 300, the wireless device receives a user-input for push-to-talk communication. The user-input may include engaging and holding a designated button or key or the user-input may be any other user-input to a designated input mechanism. For example, a voice input to a microphone for a voice-recognition equipped wireless device, a touch screen input to a touch screen display and the like. At Event 310, position determination is actuated in response to receiving the user-input for push-to-talk communication. Actuation of position determination may typically involve establishing communication with a position determining entity, such as a satellite, a network position assisting and/or determining server or the like. It should be noted that any feasible position determining process may be implemented by the wireless communication device to determine position.

Additional details and examples of specific methods that may be implemented by the wireless device and the wireless network to determine device position are provided with respect to FIGS. 10-13. Of course, the subject methods should not be construed as limiting, as other methods of position determination are contemplated and may be used in conjunction with present aspects.

Figure 10:
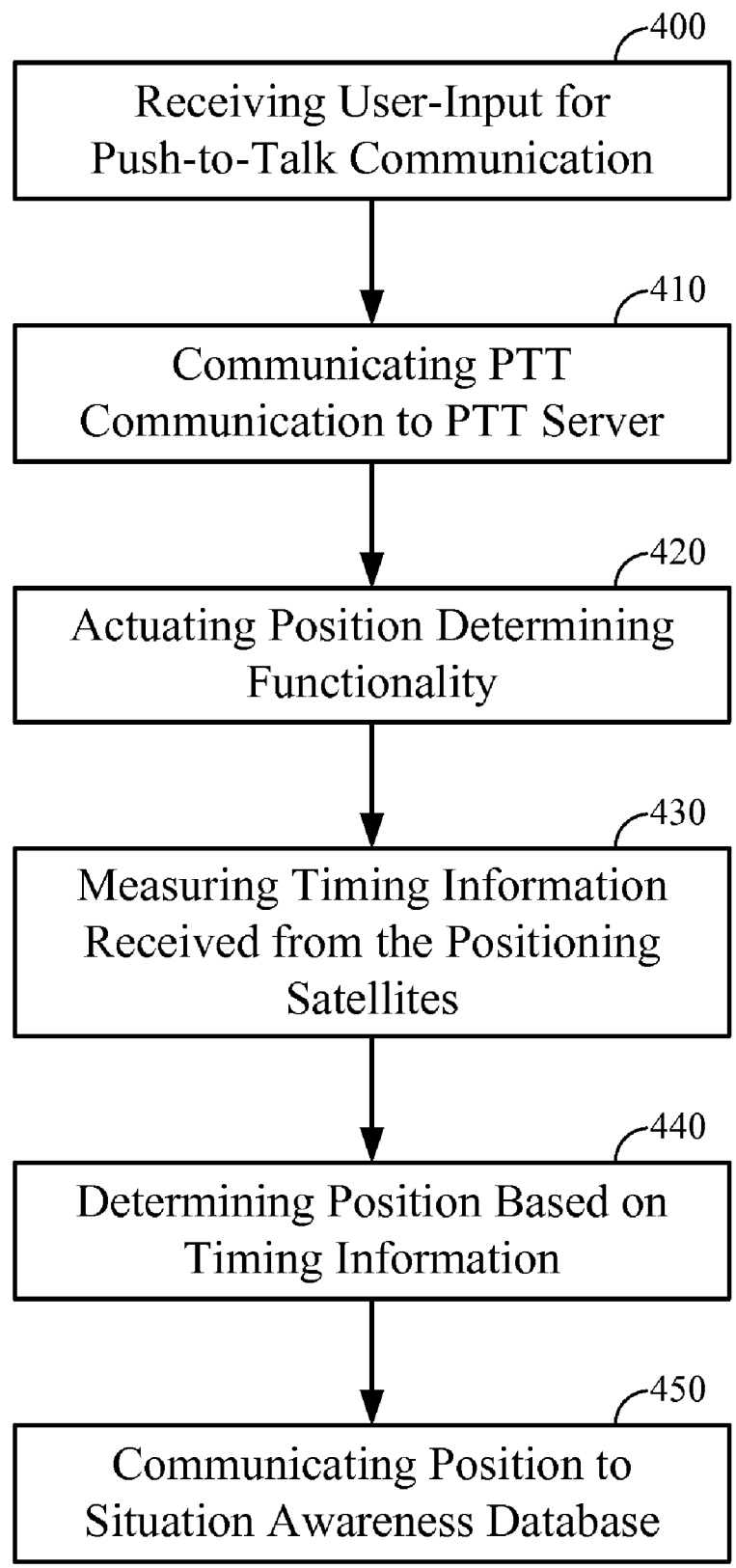
FIG. 10 is a flow chart of a method for actuating position determination based on group communication requests and subsequent Stand Alone Mode position determination, according to another aspect.

FIG. 10 depicts a flow diagram of a method for actuating a wireless device-based standalone GPS mode of position determination in a wireless device. At Event 400, the wireless device receives a user-input for push-to-talk communication and, at Event 410, the wireless device communicates a group communication request to a group communications server. In addition to sending the group communication request, the user-input for push-to-talk communication will trigger, at Event 420, the method further includes actuating of position determining functionality on the wireless device. For example, the wireless device may execute position determining module. It should be noted that in the illustrated aspect, Events 410 and 420 are conducted in sequence; however, in alternate aspects Events 410 and 420 may be conducted in parallel.

At Event 430, based on the actuation of the position determining functionality, the method includes the wireless device measuring timing information received from the positioning satellites. The timing information is used, at Event 440, to determine wireless device-to-satellite measurements and the measurements are used to calculate device position, such as geographic coordinates of the device. At optional Event 450, the wireless device may communicate the device position to the wireless network, such as to a situational awareness database and/or forwarded to the other push-to-talk/group call participants.

Figure 11:
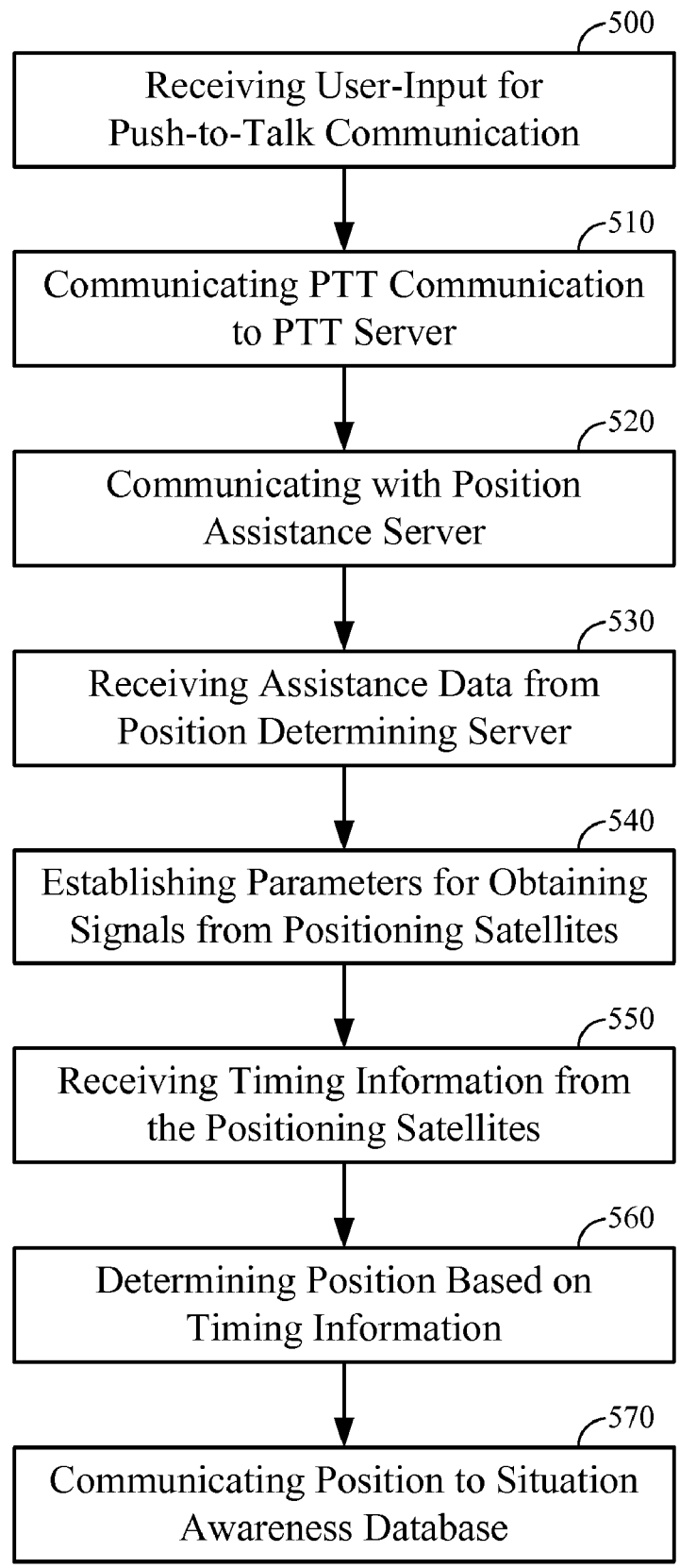
FIG. 11 is a flow chart of a method for actuating position determination based on group communication requests and subsequent Wireless Device-Based Mode position determination, according to another aspect.

FIG. 11 depicts a flow diagram of a method for actuating a wireless device-based network-assisted mode of position determination in a wireless device. At Event 500, the wireless device receives a user-input for push-to-talk communication and, at Event 510, the wireless device communicates a group communication request to a group communications server. In addition to sending the group communication request, the user-input for push-to-talk communication will trigger, at Event 520, actuation of position determination in the form of sending a position assistance request to a network device, such as a position assistance server. It should be noted that in the illustrated aspect, Events 510 and 520 are conducted in sequence on the same communication channel; however, in alternate aspects, Events 510 and 520 may be conducted in parallel on separate communication channels.

At Event 530, the wireless device receives assistance data from the network and, at Event 540, based on the assistance data, establishes parameters for receiving timing information from positioning satellites. At Event 550, the wireless device receives timing information from the positioning satellites. The timing information is used, at Event 560, to determine wireless device-to-satellite measurements and the measurements are used to calculate device position. At optional Event 570, the wireless device may communicate the device position to the wireless network, such as to a situational awareness database and/or forwarded to the other push-to-talk/group call participants.

Figure 12:
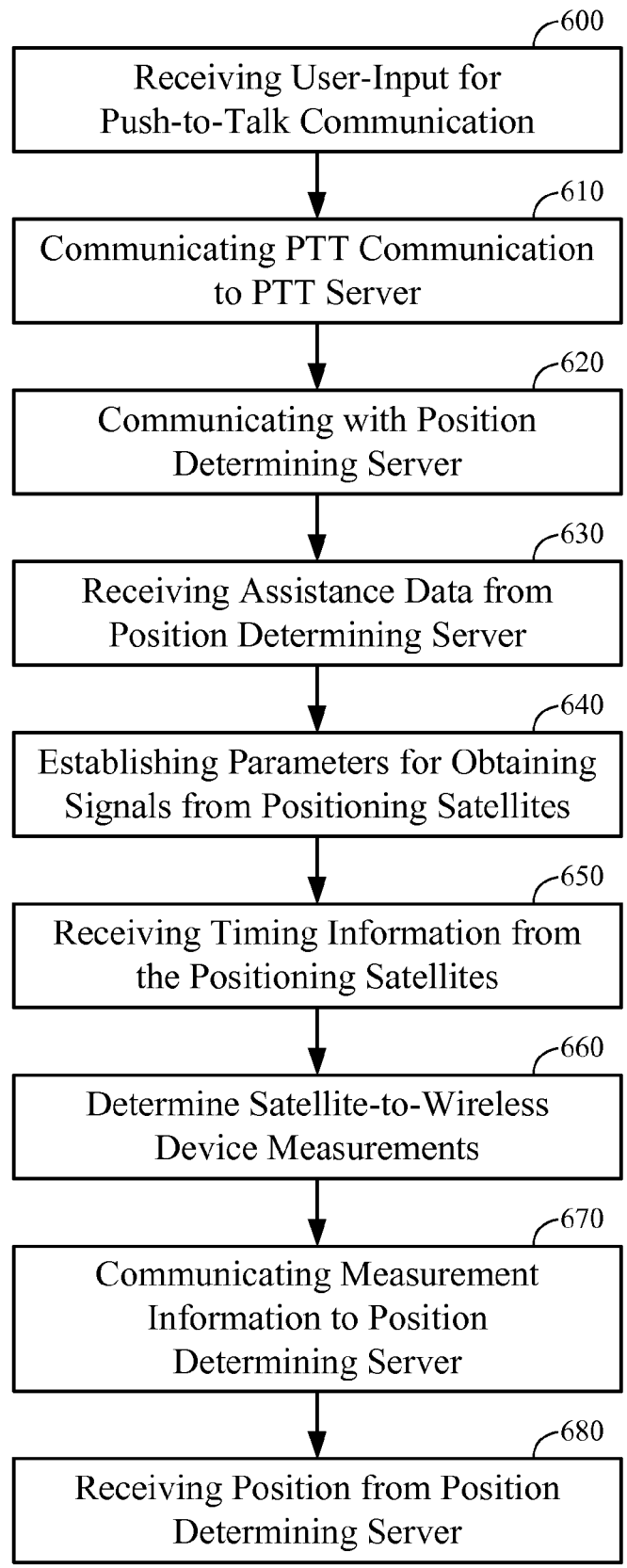
FIG. 12 is a flow chart of a method for actuating position determination based on group communication requests and subsequent Wireless Device-Assisted Mode position determination, according to another aspect.

FIG. 12 depicts a flow diagram of a method for actuating network-based mode of position determination in a wireless device. At Event 600, the wireless device receives a user-input for push-to-talk communication and, at Event 610, the wireless device communicates a group communication request to a group communications server. In addition to sending the group communication request, the user-input for push-to-talk communication will trigger, at Event 620, actuation of position determination in the form of sending a position assistance request to a network device, such as a position assistance server. It should be noted that in the illustrated aspect, Events 610 and 620 are conducted in sequence on the same communication channel; however, in alternate aspects, Events 610 and 620 may be conducted in parallel on separate communication channels.

At Event 630, the wireless device receives assistance data from the network and, at Event 640, based on the assistance data, establishes parameters for receiving timing information from positioning satellites. At Event 650, the wireless device receives timing information from the positioning satellites. At Event 660, the wireless device determines satellite-to-wireless device measurements based on the timing information. At Event 670, the measurement information is communicated to a network device, such as a position-determining server that is operable for determining the device position. At optional Event 680, the wireless device receives the device position from the network device.

Figure 13:
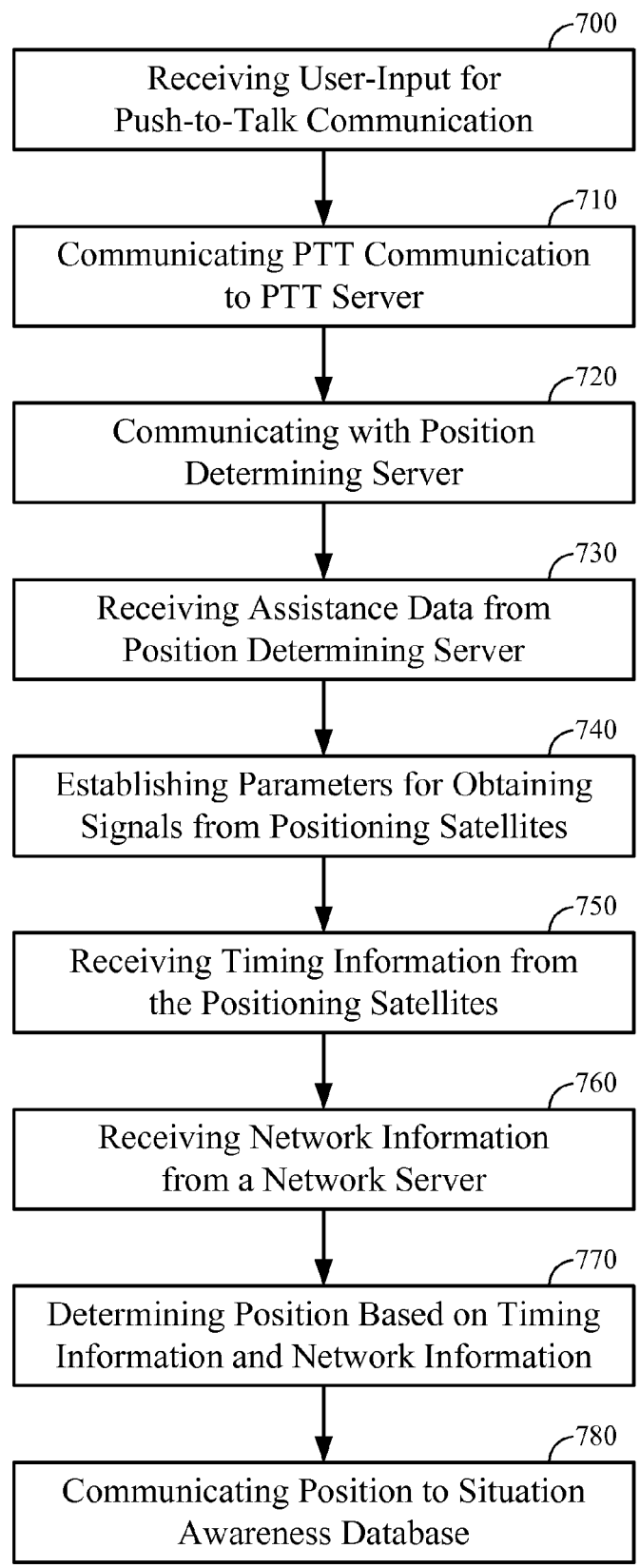
FIG. 13 is a flow chart of a method for actuating position determination based on group communication requests and subsequent Wireless Device Assisted/Hybrid Mode position determination, according to another aspect.

FIG. 13 depicts a flow diagram of a method for actuating wireless device-based assisted/hybrid mode position determination in a wireless device. At Event 700, the wireless device receives a user-input for push-to-talk communication and, at Event 710, the wireless device communicates a group communication request to a group communications server. In addition to sending the group communication request, the user-input for push-to-talk communication will trigger, at Event 720, actuation of position determination in the form of sending a position assistance request to a network device, such as a position assistance server. It should be noted that in the illustrated aspect, Events 710 and 720 are conducted in sequence on the same communication channel; however, in alternate aspects, Events 710 and 720 may be conducted in parallel on separate communication channels.

At Event 730, the wireless device receives assistance data from the network and, at Event 740, based on the assistance data, establishes parameters for receiving timing information from positioning satellites. At Event 750, the wireless device receives timing information from the positioning satellites. At Event 760, the wireless device receives network information from a network device. The timing information and network information is used, at Event 770, to calculate device position. At optional Event 780, the wireless device may communicate the device position to the wireless network, such as to a situational awareness database and/or forwarded to the other push-to-talk/group call participants.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, in one or more aspects, the functions described may be implemented in hardware, software, firmware, or any combination thereof. If implemented in software, the functions may be stored on or transmitted over as one or more instructions or code on a computer-readable media including any medium that facilitates transfer of a computer program from one place to another. A storage media may be any available media that can be accessed by a general purpose or special purpose computer. By way of example, and not limitation, such computer-readable media can comprise RAM memory, flash memory, ROM memory, EPROM memory, EEPROM memory, registers, a hard disk, a removable disk, a CD-ROM, or other optical disk storage, magnetic disk storage, or other magnetic storage devices, or any other medium that can be sued to carry or store desired program code means in the form of instructions or data structures and that can be accessed by a general-purpose or special-purpose computer, or a general-purpose or special-purpose processor. Also, any connection is properly termed a computer0readable medium. For example, if the software is transmitted from a website, server, or other remote source using a coaxial cable, fiber optic cable, twisted pair, digital subscriber line (DSL), or wireless technologies such as infrared, radio, and microware, then the coaxial cable, fiber optic cable, twisted pair, DSL, or wireless technologies such as infrared, radio, and microware are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the foregoing disclosure shows illustrative aspects and/or implementations, it should be noted that various changes and modifications could be made herein without departing from the scope of the described aspects and/or implementations as defined by the appended claims. Furthermore, although elements of the described aspects may be described or claimed in the singular, the plural is contemplated unless limitation to the singular is explicitly stated. Additionally, all or a portion of any aspect and/or implementation may be utilized with all or a portion of any other aspect and/or implementation, unless stated otherwise.

Thus, the described aspects provide for systems, methods, devices, apparatus, and machine-readable medium that provide for actuation of position determination in a wireless device based on a user input to an input mechanism associated with push-to talk communication. By marrying actuation of position determination with a user's request for push-to-talk communication (i.e., a request for a talk spurt in a PTT communication), the user is not required to perform any additional position determining initiating action to start the position determining process. In addition, the actuation of position determination is coupled with the initiation of another function on the wireless device, specifically a push-to-talk request, which benefits from having accurate and current position data available for all current call members and/or a group administrator or the like. Therefore, present aspects allow actuating position determination without requiring extraneous actions on behalf of the user or the network while providing accurate and current positional data to push-to-talk communications.

Many modifications and other aspects will come to mind of one skilled in the art to which the subject feature pertains having the benefit of the teachings presented in the foregoing descriptions and the associated drawings. Therefore, it is to be understood that the subject aspects are not to be limiting and that modifications and other implementations are intended to be included within the scope of the appended claims. Although specific terms are employed herein, such terms are used in a generic and descriptive sense only and not for purposes of limitation.

What is claimed is:

1. A method for actuating position determination at a wireless communication device, the method comprising:
  receiving a user input for a push-to-talk communication;
  determining whether said user input for a push-to-talk communication exceeds a predetermined number of user inputs for a push-to-talk communication, wherein said predetermined number is greater than one; and
  actuating position determination in response to receiving the user input for the push-to-talk communication if said user input for a push-to-talk communication does not exceed said predetermined number of user inputs for the push-to-talk communication.

2. The method of claim 1, wherein actuating position determination further comprises:
  transmitting a position request message to a position determination entity.

3. The method of claim 2, wherein transmitting the position request message comprises:
  transmitting the position request message in parallel with a push-to-talk request communication.

4. The method of claim 2, wherein transmitting the position request message comprises:
  transmitting the position request message in sequence with a push-to-talk request communication.

5. The method of claim 2, wherein transmitting the position request message to a position determination entity comprises transmitting to a wireless network server.

6. The method of claim 1, wherein actuating position determination comprises:
  transmitting a position communication to a wireless network server.

7. The method of claim 6, further comprising:
  receiving positional assistance information from the wireless network server.

8. The method of claim 6, further comprising:
  receiving positional assistance information from the wireless network server;
  receiving timing information from Global Positioning System satellites based on the positional assistance information; and
  determining, at the wireless communication device, a position based on the timing information.

9. The method of claim 6, further comprising:
  receiving positional assistance information from the wireless network server;
  receiving timing information from Global Positioning System satellites based on the positional assistance information; and
  transmitting the timing information to the wireless network server for determining, at the wireless network server, a position based on the timing information.

10. The method of claim 6, further comprising:
  receiving positional assistance information from the wireless network server;
  receiving timing information from Global Positioning System satellites based on the positional assistance information;
  receiving network information from a network device; and
  determining, at the wireless device, a position based on the timing information and the network information.

11. The method of claim 1, further comprising:
  obtaining position information from a position determination entity in response to actuating position determination.

12. The method of claim 11, wherein obtaining position information comprises obtaining timing information from a satellite.

13. The method of claim 11, wherein obtaining position information comprises obtaining position assistance information from a wireless network server.

14. The method of claim 11, further comprising:
  determining a wireless communication device position based on the obtained position information.

15. The method of claim 14, wherein determining a wireless communication device position comprises:
  determining a position comprising at least a geographic position, a pseudorange, a call point identifier, an access point identifier, or a base station identifier.

16. The method of claim 1, wherein actuating position determination comprises:
  receiving timing information from a Global Positioning System satellite and determining, at the wireless communication device, a position based on a timing information.

17. The method of claim 1, wherein said determining whether said user input for a push-to-talk communication exceeds a predetermined number of user inputs for a push-to-talk-communication is determined based upon a predetermined time period for the push-to-talk communication.

18. The method of claim 1, wherein actuating position determination in response to receiving the user input for the push-to-talk communication occurs if the wireless communication device has been determined to have changed geographic position.

19. An apparatus, comprising:
  a processor capable of:
    receiving a user input for a push-to-talk communication;
    determining whether said user input for a push-to-talk communication exceeds a predetermined number of user inputs for a push-to-talk-communication, wherein said predetermined number is greater than one; and
    actuating position determination in response to receiving the user input for the push-to-talk communication if said user input for a push-to-talk communication does not exceed said predetermined number of user inputs for the push-to-talk communication.

20. A computer program product, comprising:
  computer-readable medium including:
    instruction for causing a computer to receive a user input for a push-to-talk communication;
    instruction for determining whether said user input for a push-to-talk communication exceeds a predetermined number of user inputs for a push-to-talk-communication, wherein said predetermined number is greater than one; and
    instruction for causing a computer to actuate position determination in response to receiving the user input for the push-to-talk communication if said user input for a push-to-talk communication does not exceed said predetermined number of user inputs for the push-to-talk communication.

21. A wireless communication device, comprising:
  a computer platform including a processor and a memory;
  an input mechanism in communication with the processor, the input mechanism operable to receive a user input to activate a push-to-talk communication; and
  a position actuation module stored in the memory and executable by the processor, wherein the position actuation module is operable to monitor for the user input to the input mechanism and to actuate position determination in response to receiving the user input to the input mechanism for a predetermined number of user inputs for the push-to-talk communication, wherein said position actuation module is operable to determine whether said user input for a push-to-talk communication exceeds a predetermined number of user inputs for a push-to-talk-communication, wherein said predetermined number is greater than one and wherein said position actuation module actuates position determination if said user input for a push-to-talk communication does not exceed said predetermined number.

22. The device of claim 21, wherein the position actuation module is further operable to transmit a position request message to a position determination entity.

23. The device of claim 22 wherein the position request message comprises timing measurements based on signals broadcast by positioning satellites.

24. The device of claim 22, wherein the position determination entity comprises a wireless network server.

25. The device of claim 21, further comprising:
a group communications control module stored in the memory and executable by the processing unit, wherein the group communications control module is operable to actuate a group communication request in response to receiving the user input to the input mechanism.

26. The device of claim 25, wherein the group communications control module is operable to transmit a group communication request in parallel with a position request message or in sequence with the position request message.

27. The device of claim 21, wherein the position actuation module is operable to obtain position information from a position determination entity in response to actuating position determination.

28. The device of claim 27, wherein the position actuation module is further operable to obtain timing information from a satellite.

29. The device of claim 27, wherein the position actuation module is further operable to obtain position assistance information from a wireless network server.

30. The device of claim 27, wherein the position actuation module is further operable to determine a wireless device position based on the obtained position information.

31. The device of claim 30, wherein the wireless device position comprises at least a geographic position, a pseudorange, a call point identifier, an access point identifier, or a base station identifier.

32. The device of claim 21, wherein the position actuation module is further operable to receive timing information from Global Positioning System satellite and to determine, at the wireless communication device, a position based on the timing information.

33. The device of claim 21, wherein the position actuation module is further operable to transmit a position communication to a wireless network server, to receive positional assistance information from the wireless network server, to receive timing information from a Global Positioning System satellite based on the positional assistance information, and to determine, at the wireless communication device, a position based on the timing information.

34. The device of claim 21, wherein the position actuation module is further operable to transmit a position communication to a wireless network server, to receive positional assistance information from the wireless network server, to receive timing information from a Global Positioning System satellite based on the positional assistance information, and to transmit the timing information to the wireless network server for determining, at the wireless network server, a position based on the timing information.

35. The device of claim 21, wherein the position actuation module is further operable to transmit a position communication to a wireless network server, to receive positional assistance information from the wireless network server, to receive timing information from a Global Positioning System satellite based on the positional assistance information, to receive network information from a network device, and to determine, at the wireless device, a position based on the timing information and the network information.

36. A wireless communication device, comprising:
means for receiving a user input for a push-to-talk communication;
means for determining whether said user input for a push-to-talk communication exceeds a predetermined number of user inputs for a push-to-talk-communication, wherein said predetermined number is greater than one; and
means for actuating position determination in response to receiving the user input for the push-to-talk communication if said user input for a push-to-talk communication does not exceed said predetermined number of user inputs for the push-to-talk communication.

37. A system for actuating position determination in a wireless communication device, the system comprising:
a wireless communication device including:
a computer platform including a processor and a memory;
an input mechanism in communication with the processor, the input mechanism operable to receive a user input to activate a push-to-talk communication; and
a position actuation module stored in the memory and executable by the processor, wherein the position actuation module is operable to monitor for the user input to the input mechanism and to actuate position determination in response to receiving the user input to the input mechanism wherein said position actuation module is operable to determine whether said user input to activate a push-to-talk communication exceeds a predetermined number of user inputs for a push-to-talk-communication, wherein said predetermined number is greater than one and wherein said position actuation module actuates position determination; and
a position determination entity in communication with the wireless communication device and operable to provide position determination information to the wireless communication device for a predetermined number of user inputs for the push-to-talk communication if said user input for a push-to-talk communication does not exceed said predetermined number.

38. The system of claim 37, wherein the position determination entity is further defined as a satellite in satellite communication with the wireless communication device and operable to transmit timing information to the wireless communication device.

39. The system of claim 37, wherein the position determination entity is further defined as a wireless network server in wireless communication with the wireless communication device and operable to transmit position assistance information to the wireless communication device.

* * * * *